United States Patent

Ohno

[11] Patent Number: 5,825,557
[45] Date of Patent: Oct. 20, 1998

[54] TWO-GROUP ZOOM LENS

[75] Inventor: Kazunori Ohno, Omiya, Japan

[73] Assignee: Fuji Photo Optical Co. Ltd., Omiya, Japan

[21] Appl. No.: 743,358

[22] Filed: Nov. 4, 1996

[30] Foreign Application Priority Data

Nov. 6, 1995 [JP] Japan .................................. 7-313628

[51] Int. Cl.$^6$ .................................................. G02B 15/14
[52] U.S. Cl. .......................................... 359/692; 359/691
[58] Field of Search .................................. 359/692, 690, 359/691

[56] References Cited

U.S. PATENT DOCUMENTS

| 4,844,600 | 7/1989 | Tokumaru ................................ 359/684 |
| 4,936,661 | 6/1990 | Betensky et al. . | |
| 5,082,360 | 1/1992 | Sato et al. ................................ 359/675 |
| 5,646,787 | 7/1997 | Kamo ...................................... 359/692 |

FOREIGN PATENT DOCUMENTS

5-188293  7/1993  Japan .
6-3591    1/1994  Japan .

*Primary Examiner*—Gorgia Y. Epps
*Assistant Examiner*—Evelyn A. Lester
*Attorney, Agent, or Firm*—Ronald R. Snider

[57] ABSTRACT

In a compact two-group zoom lens composed of a positive front group ($G_1$) and a negative rear group ($G_2$), the rear group ($G_2$) is constituted by negative, positive, and negative lenses, thereby improving productivity while attaining a high magnification of about 3×. The zoom lens is constituted by the front group ($G_1$) comprising four sheets of lenses ($L_1$ to $L_4$) and the rear group ($G_2$) comprising three sheets of lenses ($L_5$ to $L_7$). The rear group ($G_2$) has the fifth lens ($L_5$) made of a biconcave plastic lens having aspheric surfaces on both sides, whose surface with a stronger curvature is directed onto the object side on the optical axis (X); the sixth lens ($L_6$) made of a biconvex lens having a surface with a stronger curvature directed onto the object side; and the seventh lens ($L_7$) made of a negative meniscus lens having a concave surface directed onto the object side.

5 Claims, 12 Drawing Sheets

FIG.1
EMBODIMENT 1

FIG.3 EMBODIMENT 3

FIG.11A  FIG.11B  FIG.11C

TWO-GROUP ZOOM LENS

RELATED APPLICATIONS

This application claims the priority of Japanese Patent Application No. 7-313628 filed on Nov. 6, 1995, which is incorporated herein by reference.

BACKGROUND OF THE INVENTION

1. Field of the Invention

The present invention relates to a compact two-group zoom lens having a variable power ratio of about 3, which is suitable for still cameras and electronic still cameras.

2. Description of the Prior Art

Conventionally, a zoom lens composed of two groups which are respectively positive and negative has widely been used for compact cameras. Recently, of such a lens, that having a variable power ratio of about 3 has been developed in response to a demand for higher magnification in compact cameras.

This positive and negative two-group zoom lens, which is advantageous in that the whole lens length can be shortened while having a zoom function, is particularly suitable for compact cameras.

Of the above-mentioned positive and negative two-group zoom lens, there has been known the one in which the lens closest to the object in the rear group having a negative refractive power as a whole is constituted by a positive lens, for example, as disclosed in Japanese Unexamined Patent Publication No. 5-188293 and No. 6-3591.

In the lens having such a configuration, however, since each of the front group having a positive refractive power as a whole and the first lens (closest to the front group) in the rear group has a positive refractive power, the total positive refractive power of the zoom lens, in the one which has not yet attained a high magnification and compact size in particular, has become very strong, thereby yielding a greater difference in imaging magnification with respect to the negative lens system of the rear group. Accordingly, it has been difficult to keep fluctuation in aberration and accuracy in eccentricity at favorable levels, whereby productivity has been deteriorated.

While a lens system in which the rear group is constituted by two negative lens sheets as disclosed in Japanese Patent Publication No. 6-25825 has been known, such a lens system has a low variable power ratio of about 1.5 due to its insufficient achromatic effect though with an improved imaging relationship.

SUMMARY OF THE INVENTION

In view of such a circumstance, the object of the present invention is to provide a two-group zoom lens which is excellent in productivity and inexpensive to manufacture while satisfying demands for higher magnification and compact size.

In the two-group zoom lens of the present invention, a rear group $G_2$ having a negative refractive power is constituted by a negative lens $L_1$, a positive lens $L_2$, and a negative lens $L_3$ successively disposed from the object side, thereby overcoming the problems of the conventional positive and negative two-group zoom lens.

Namely, the two-group zoom lens of the present invention is a two-group zoom lens comprising, successively from the object side, a front group $G_1$ having a positive refractive power and a rear group $G_2$ having a negative refractive power, in which distance between the front group and the rear group is changed so as to alter the focal length of the whole lens system;

wherein the rear group $G_2$ comprises, successively from the object side, a first lens $L_{B1}$ having a negative refractive power, a second lens $L_{B2}$ having a positive refractive power, and a negative third lens $L_{B3}$ having a concave surface directed onto the object side.

Assuming that paraxial focal length of the first lens $L_{B1}$ is $f_{B1}$, paraxial focal length of the second lens $L_{B2}$ is $f_{B2}$, focal length of the whole lens system at its wide angle end is $f_w$, and Abbe number of glass material of the second lens $L_{B2}$ is $v_{B2}$, such a two-group zoom lens is desirably configured so as to satisfy the following conditional expressions (1) to (3):

(1) $-1.0 < f_w/f_{B1} < -0.1$ (2) $0.5 < f_w/f_{B2} < 1.7$ (3) $v_{B2} < 43.0$

Further, desirably, the zoom lens is configured such that at least one aspherical lens is disposed in each lens group or such that at least one plastic lens is disposed in each lens group.

DETAILED DESCRIPTION OF THE PREFERRED EMBODIMENTS

In the following, embodiments of the present invention will be explained with reference to drawings.

Figure 1:
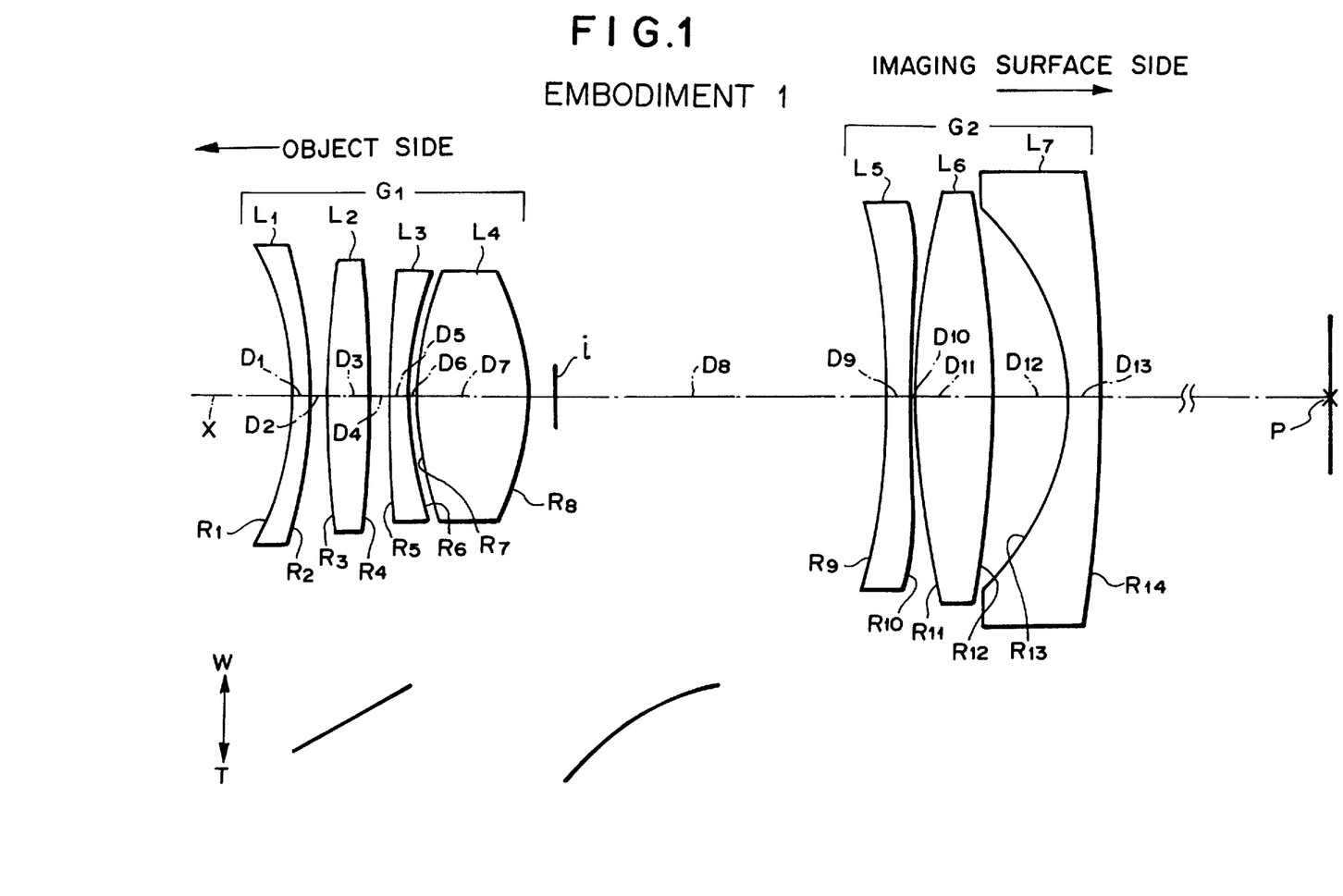
FIG. 1 is a schematic view showing a basic lens configuration (at the wide angle end) in accordance with Embodiment 1 of the present invention.
Figure 2:
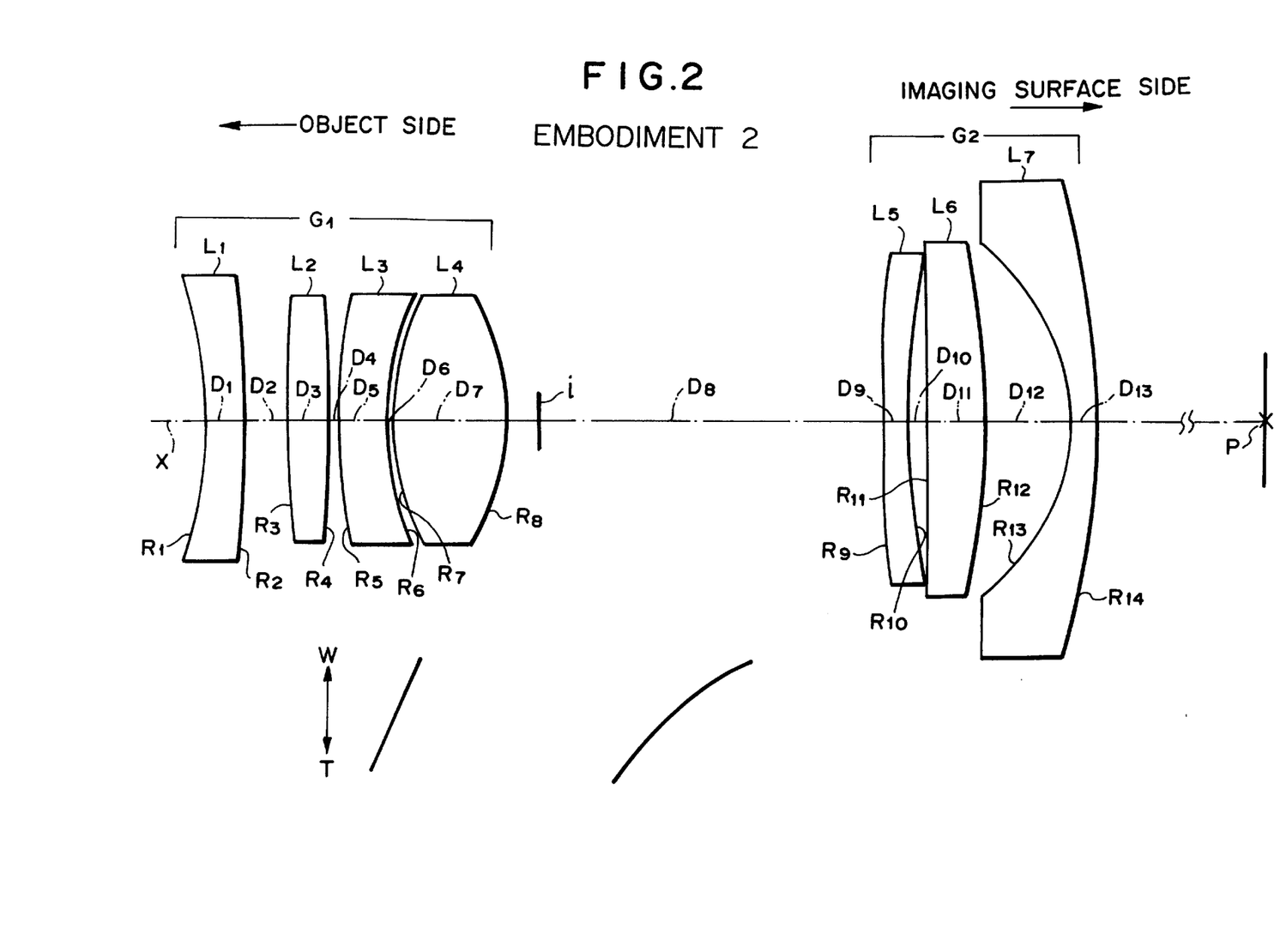
FIG. 2 is a schematic view showing a basic lens configuration (at the wide angle end) in accordance with Embodiment 2 of the present invention.
Figure 3:
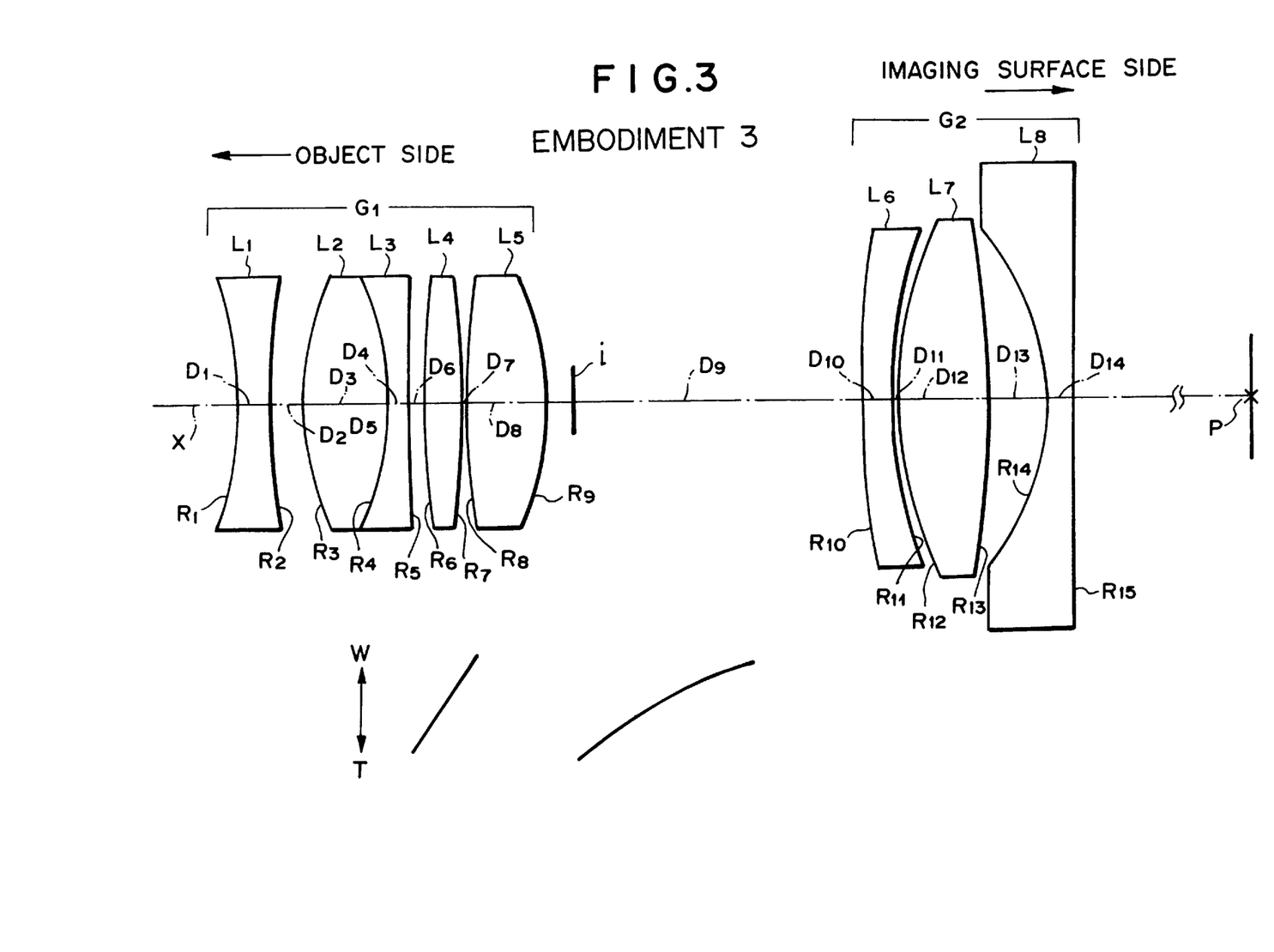
FIG. 3 is a schematic view showing a basic lens configuration (at the wide angle end) in accordance with Embodiment 3 of the present invention.
Figure 4A:
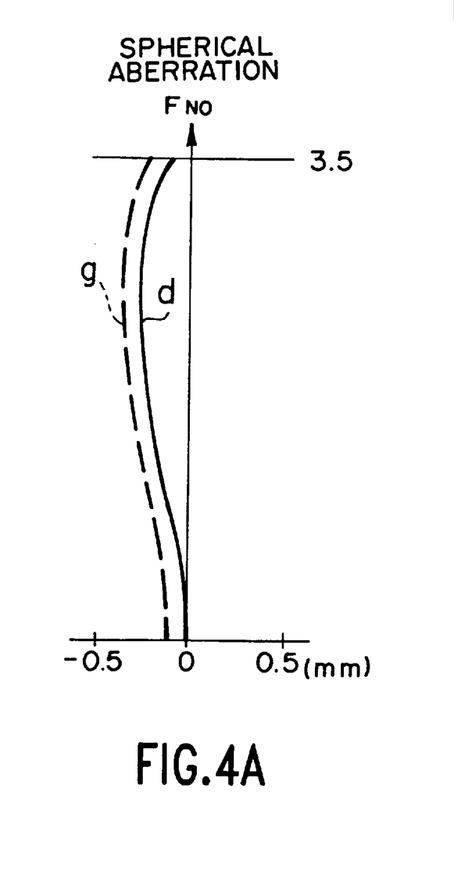
FIG. 4 is an aberration chart of the lens in accordance with Embodiment 1 at its wide angle end.
Figure 4B:
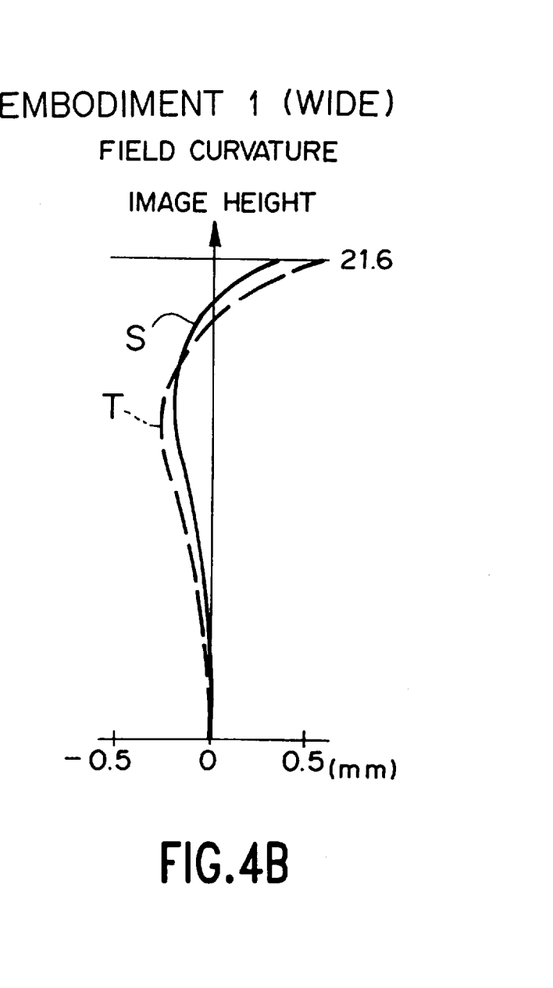
Figure 4C:
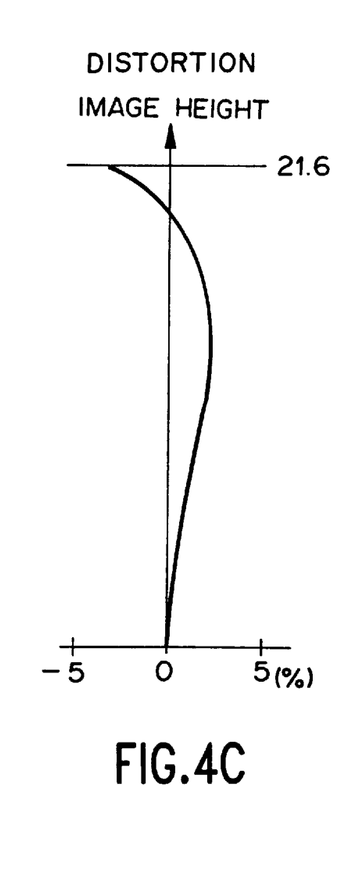
Figure 5A:
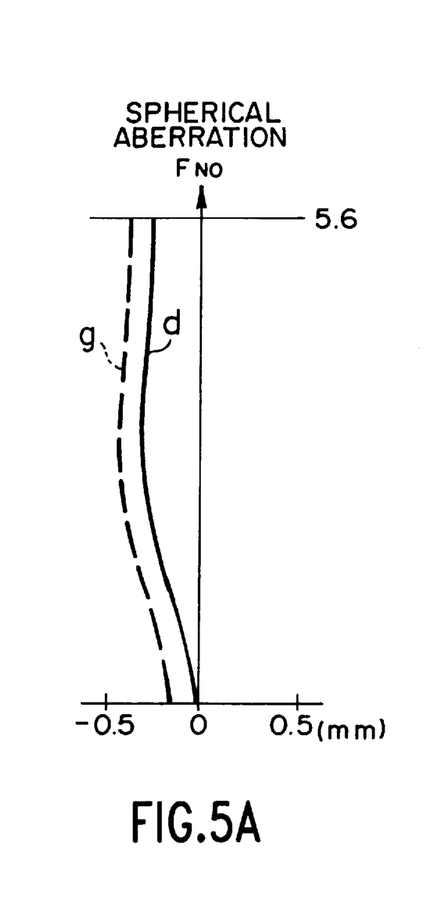
FIG. 5 is an aberration chart of the lens in accordance with Embodiment 1 at its middle region.
Figure 5B:
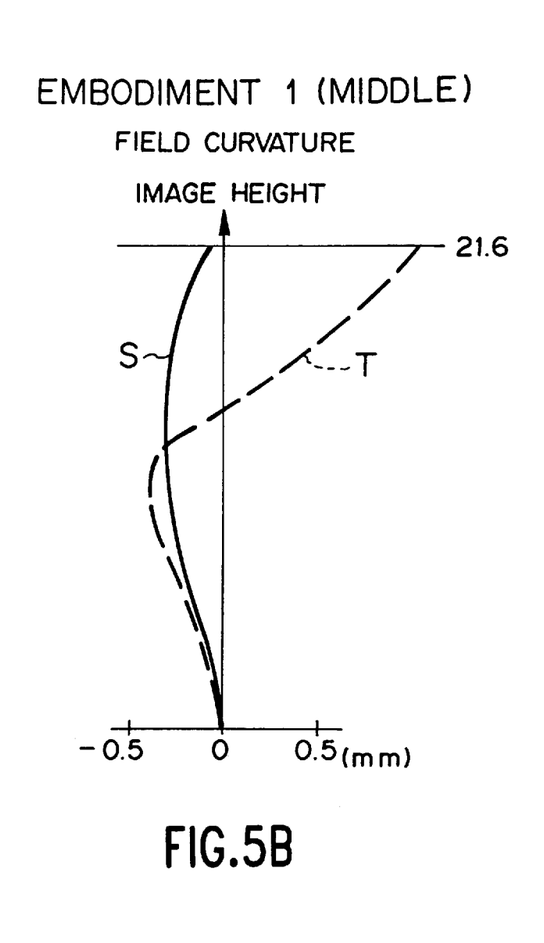
Figure 5C:
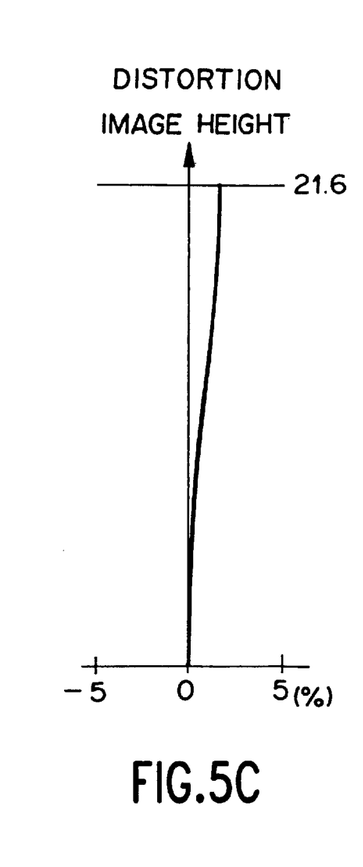
Figure 6A:
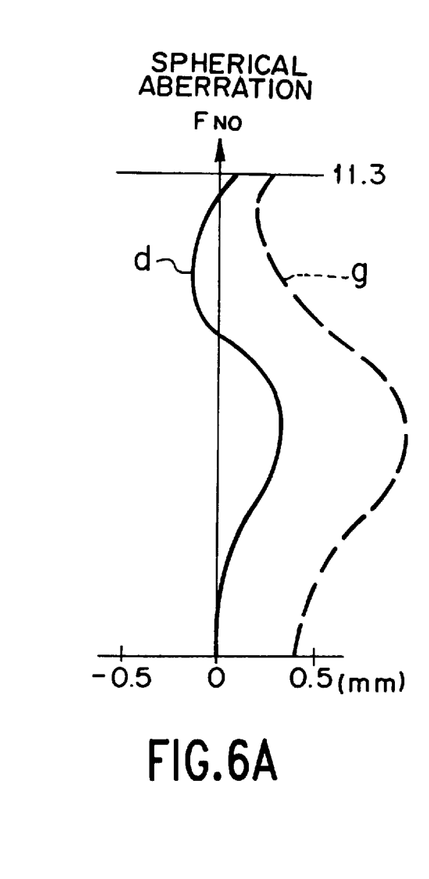
FIG. 6 is an aberration chart of the lens in accordance with Embodiment 1 at its telephoto end.
Figure 6B:
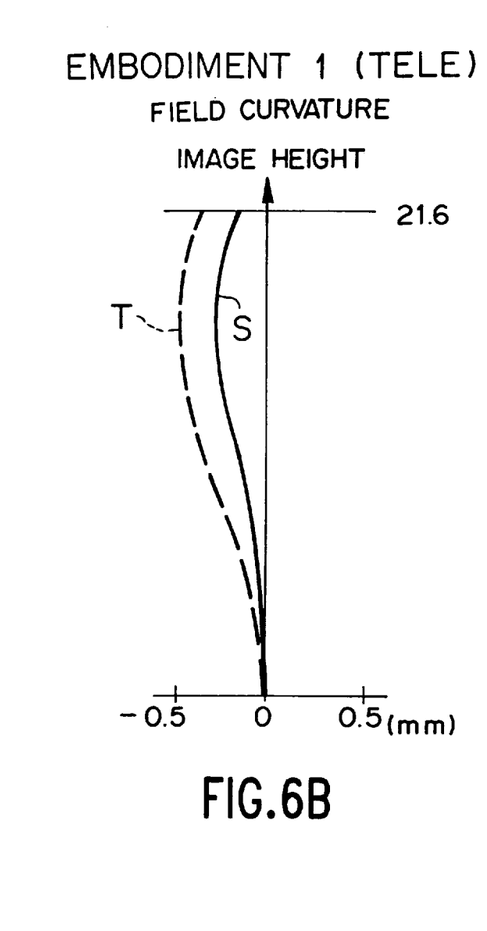
Figure 6C:
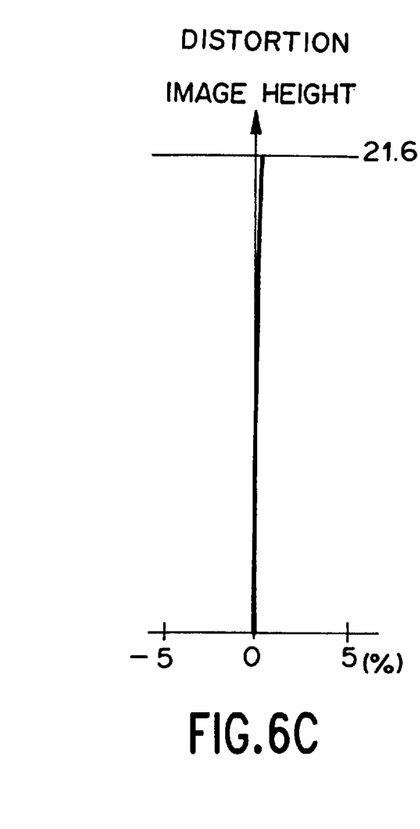
Figure 7A:
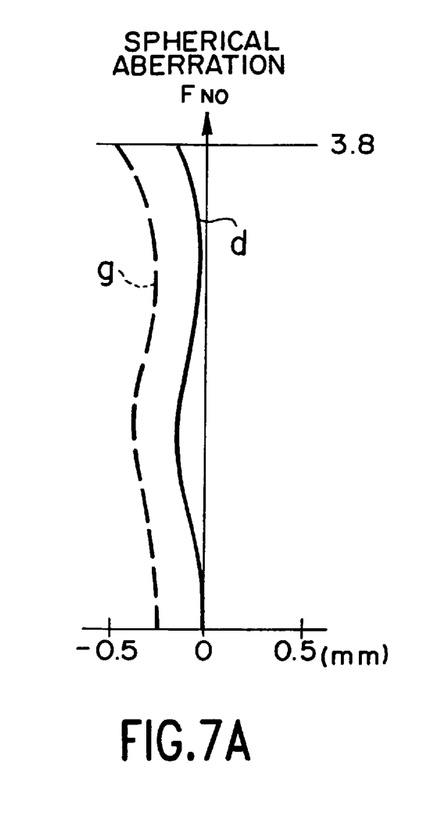
FIG. 7 is an aberration chart of the lens in accordance with Embodiment 2 at its wide angle end.
Figure 7B:
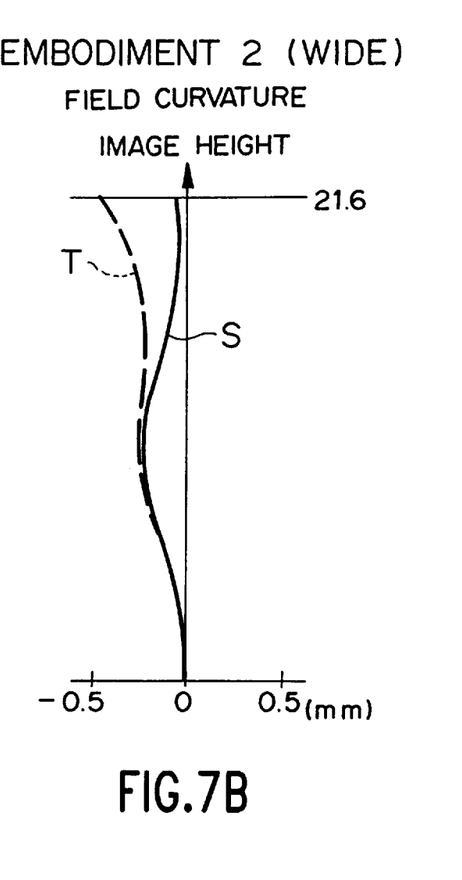
Figure 7C:
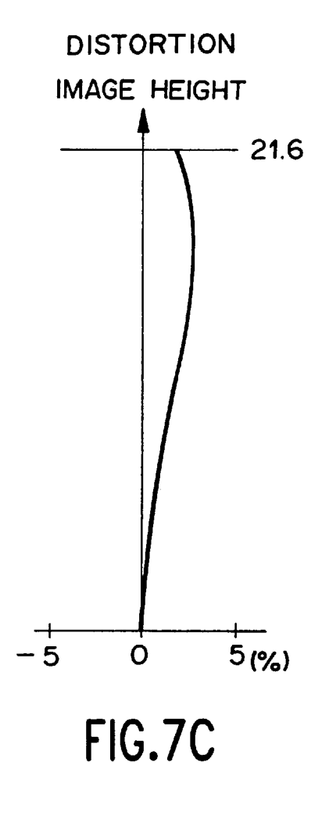
Figure 8A:
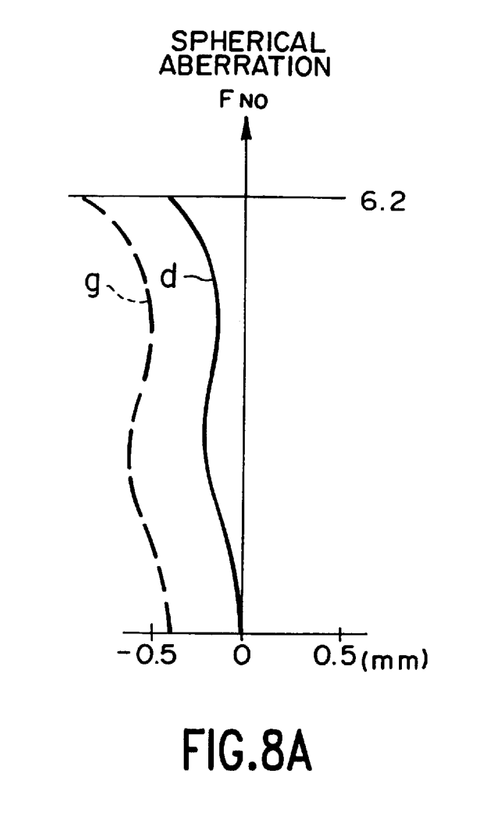
FIG. 8 is an aberration chart of the lens in accordance with Embodiment 2 at its middle region.
Figure 8B:
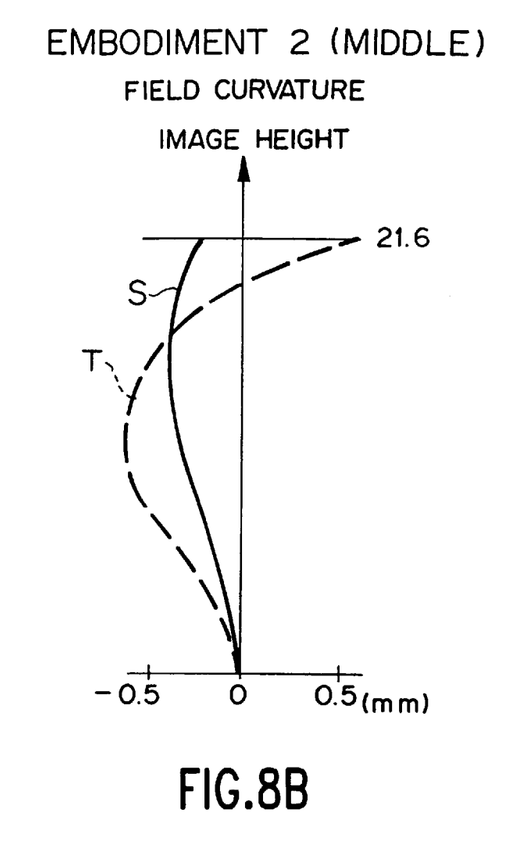
Figure 8C:
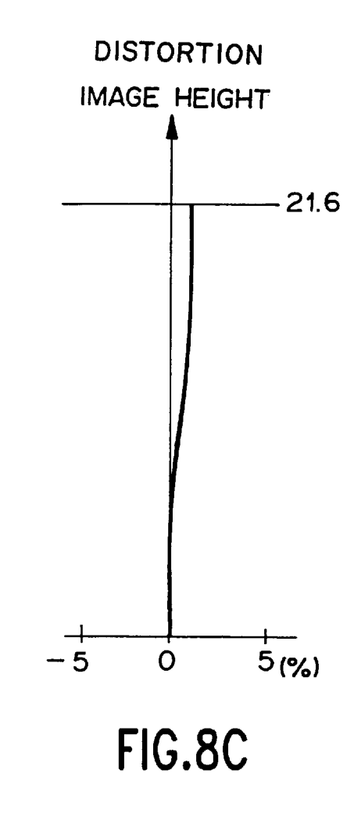
Figure 9A:
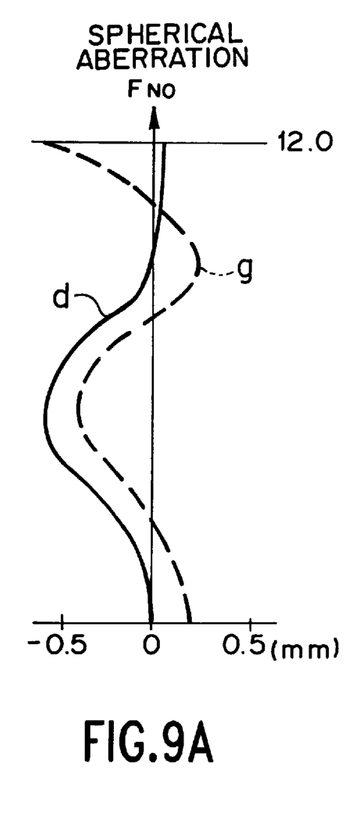
FIG. 9 is an aberration chart of the lens in accordance with Embodiment 2 at its telephoto end.
Figure 9B:
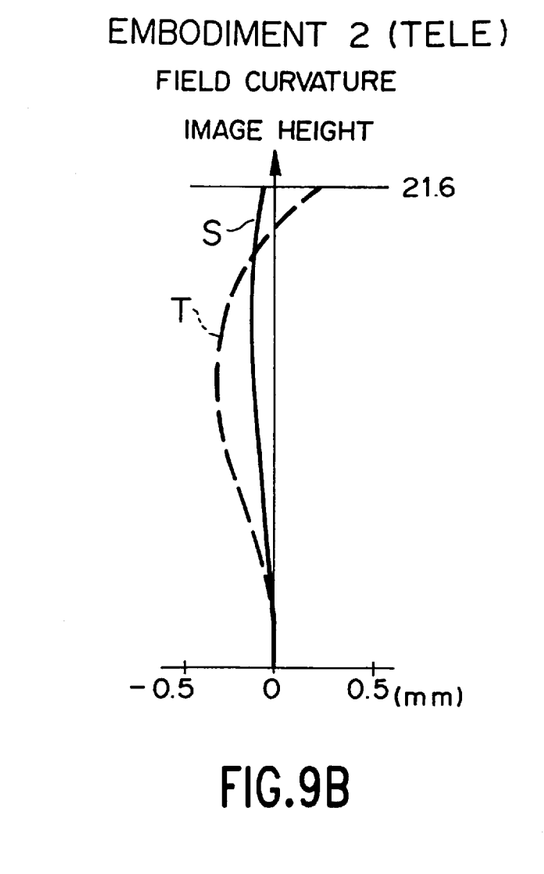
Figure 9C:
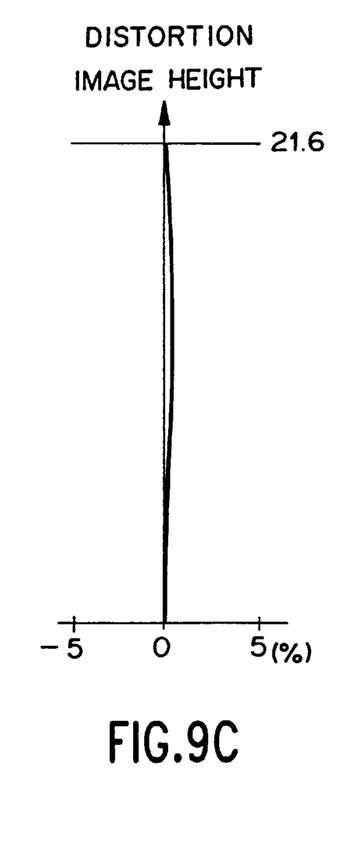
Figure 10A:
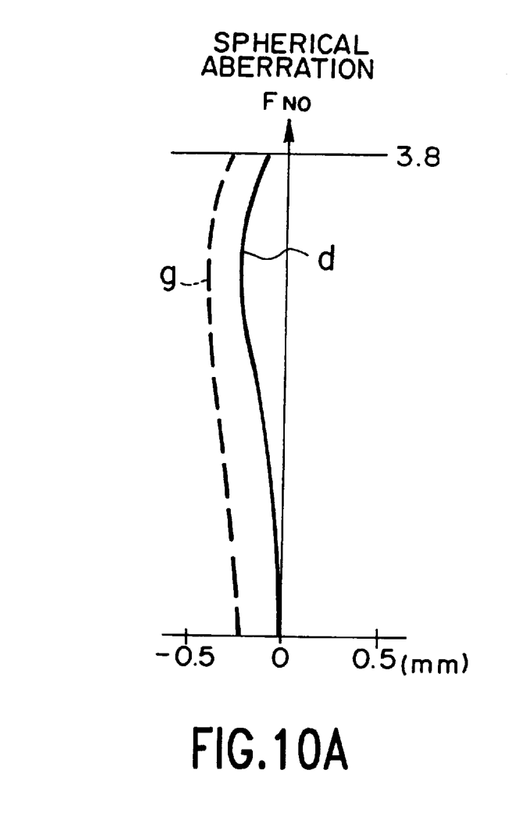
FIG. 10 is an aberration chart of the lens in accordance with Embodiment 3 at its wide angle end.
Figure 10B:
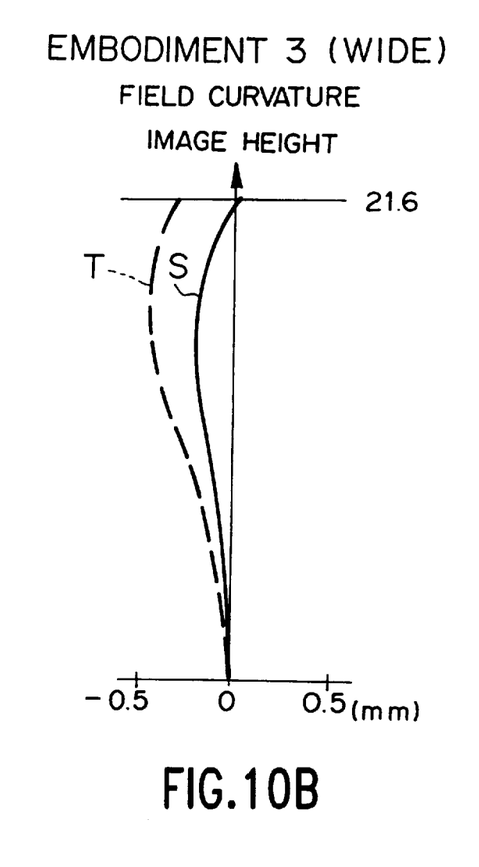
Figure 10C:
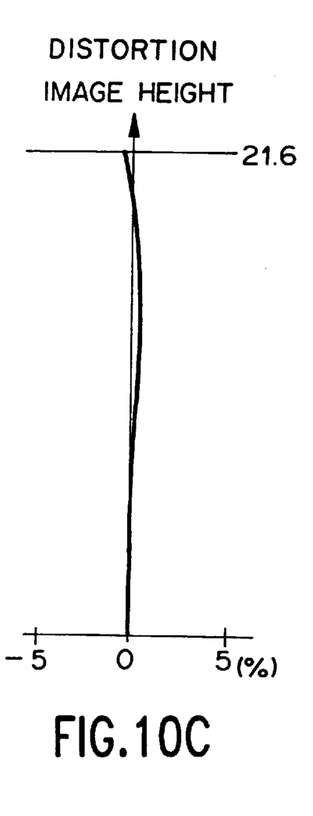
Figure 11A:
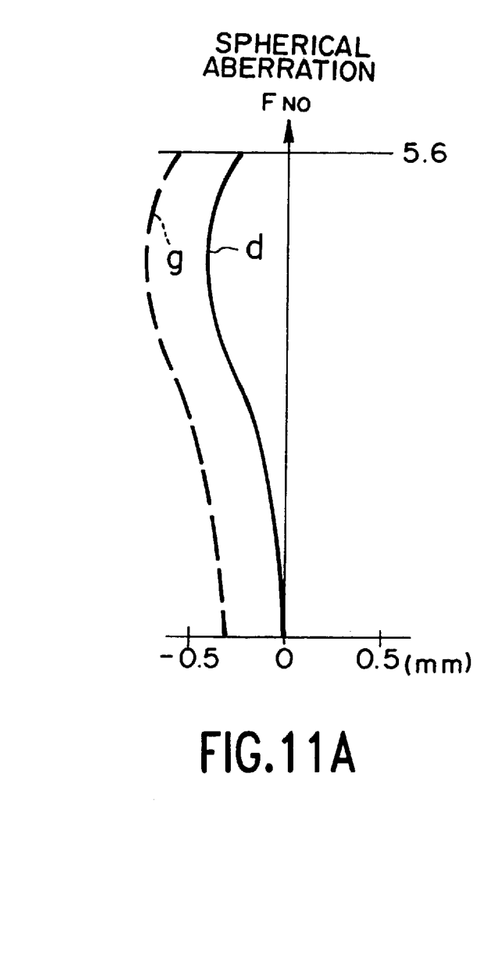
FIG. 11 is an aberration chart of the lens in accordance with Embodiment 3 at its middle region.
Figure 11B:
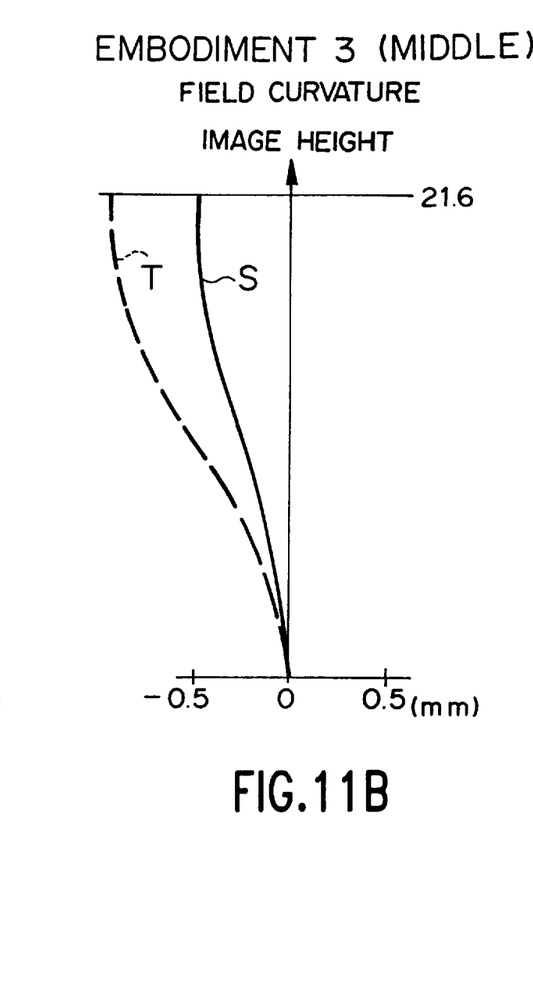
Figure 11C:
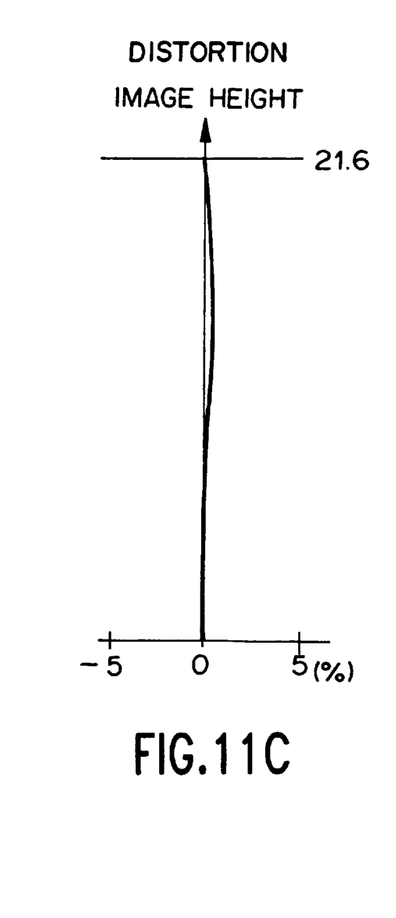
Figure 12A:
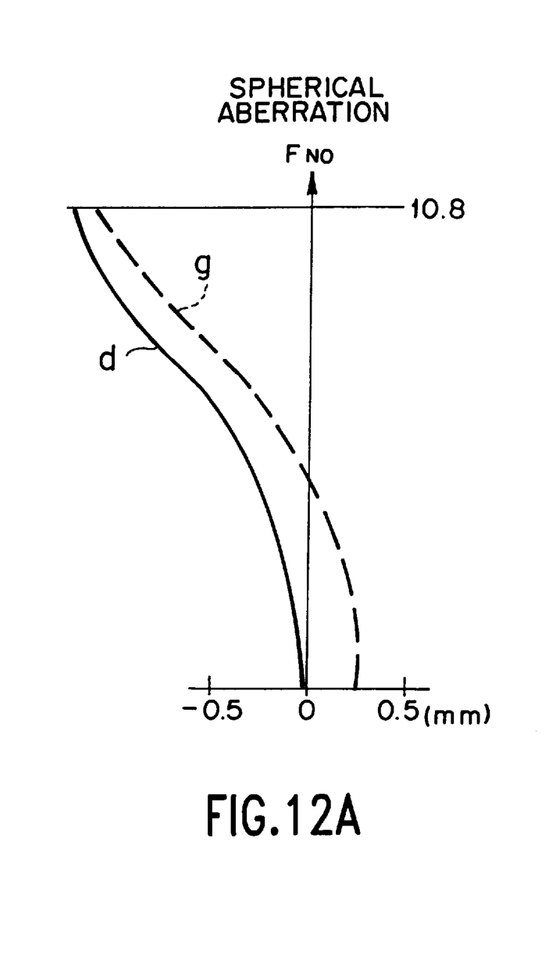
FIG. 12 is an aberration chart of the lens in accordance with Embodiment 3 at its telephoto end.
Figure 12B:
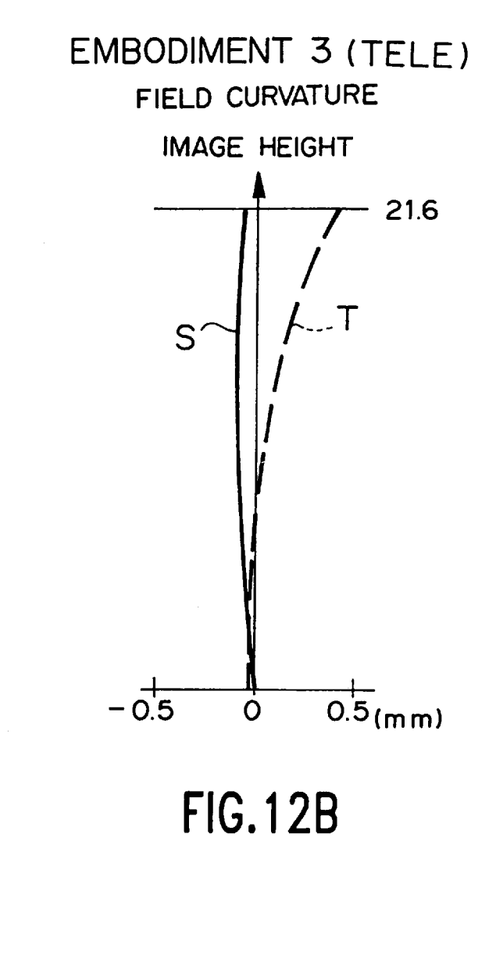
Figure 12C:
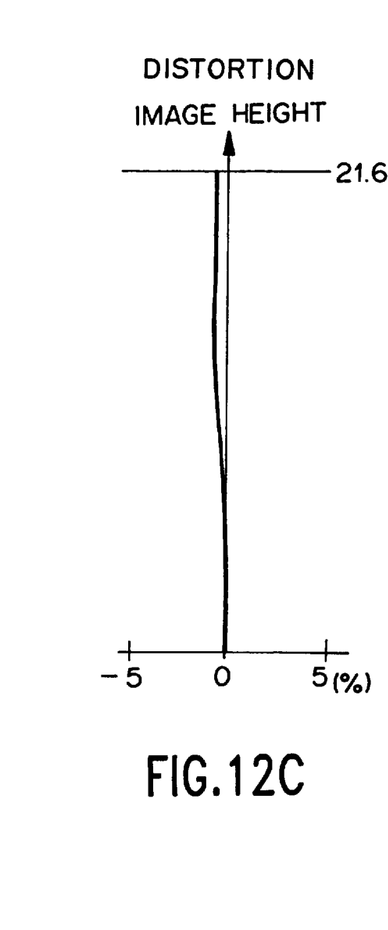

FIGS. 1 to 3 show compact two-group zoom lenses in accordance with respective embodiments. Namely, each of them is a zoom lens comprising, successively from the object side, a front group $G_1$ having a positive refractive power as a whole and a rear group $G_2$ having a negative refractive power as a whole; in which, when zooming, the first lens group $G_1$ and the second lens group $G_2$ move along an optical axis X (with lower part of each drawing indicating the locus of movement of each group) while changing the distance therebetween, thereby changing focal length f of the whole system and efficiently converging a luminous flux onto an imaging surface (whereby a parallel luminous flux incident on the lens system in parallel to the optical axis X forms an image at an imaging position P).

Also, the rear group $G_2$ is configured such that, successively from the object side, a rear-group first lens $L_{B1}$ having a negative refractive power, a rear-group second lens $L_{B2}$ having a positive refractive power, and a negative rear-group third lens $L_{B3}$ having a concave surface directed onto the object side are disposed therein.

Further, assuming that paraxial focal length of the first lens $L_{B1}$ is $f_{B1}$, paraxial focal length of the second lens $L_{B2}$ is $f_{B2}$, focal length of the whole lens system at its wide angle end is fw, and Abbe number of glass material of the second lens $L_{B2}$ is $\upsilon_{B2}$, the following conditional expressions (1) to (3):

(1) $-1.0 < f_w/f_{B1} < -0.1$ (2) $0.5 < f_w/f_{B2} < 1.7$ (3) $\upsilon_{B2} < 43.0$ are satisfied.

Also, the zoom lens of each embodiment mentioned above is configured such that at least one aspherical lens is disposed in each of the first group $G_1$ and the second group $G_2$ and such that at least one plastic lens is disposed in each of the first group $G_1$ and the second group $G_2$.

As mentioned above, in the two-group zoom lens of each embodiment, the rear group $G_2$ having a negative refractive power comprises, successively from the object side, the negative lens $L_{B1}$, the positive lens $L_{B2}$, and the negative lens $L_{B3}$, so as to overcome the problems of the conventional positive and negative two-group zoom lens, whereby a lens system which has a favorable productivity while being a high-magnification zoom lens with a magnification of about 3× can be constituted.

In the following, technical significance of each of the above-mentioned expressions (1) to (3) will be explained.

Namely, the above-mentioned conditional expression (1) defines the refractive power of the lens $L_{B1}$ closest to the object side in the rear group $G_2$. Below the lower limit of expression (1), the whole length of the lens system becomes too large to attain a compact size. Beyond the upper limit, by contrast, though the whole length of the lens system is favorably shortened so as to attain a compact size, it is undesirable in that a strict accuracy is required for the relationship between the lenses $L_{B2}$ and $L_{B3}$ in the subsequent step.

Also, the above-mentioned conditional expression (2) defines the refractive power of the positive lens $L_{B2}$ constituting the rear group $G_2$. Below the lower limit of expression (2), the whole length of the lens system becomes too large to attain a compact size, while corrections for chromatic aberration and distortion are deteriorated. Beyond the upper limit, by contrast, though it is advantageous in terms of compactness, problems such as requirement for higher precision in parts may occur.

Further, the above-mentioned conditional expression (3) relates to Abbe number $\upsilon_{B2}$ of glass material of the second lens $L_{B2}$ constituting the rear group $G_2$, defining a range which satisfies conditions for the refractive power and achromatism of the lens $L_{B2}$ in the rear group $G_2$. Beyond the upper limit thereof, the refractive power of the lens $L_{B2}$ becomes too strong in order to correct chromatic aberration, thereby making it necessary to attain a higher precision in parts.

Also, when an aspherical lens is disposed in each of the lens groups $G_1$ and $G_2$ as mentioned above, the deterioration in aberration due to a higher magnification can be corrected without increasing the number of sheets constituting the lens.

Further, when at least one plastic lens is disposed in each of the lens groups $G_1$ and $G_2$ as mentioned above, the cost for making the zoom lens can be lowered. Also, when this plastic lens is made aspheric, the cost can be further lowered. When the plastic lenses respectively disposed in the lens groups $G_1$ and $G_2$ are set to have refractive powers having signs of polarity opposite to each other, the fluctuation in imaging position due to change in temperature can be minimized, thereby compensating for a shortcoming of a plastic lens that it is sensitive to change in temperature.

In the following, each embodiment will be explained in detail.

(Embodiment 1)

As shown in FIG. 1, the two-group zoom lens of Embodiment 1 is constituted by the front group $G_1$ comprising four sheets of lenses $L_1$ to $L_4$ and the rear group $G_2$ comprising three sheets of lenses $L_5$ to $L_7$. The front group $G_1$ has the first lens $L_1$ made of a negative meniscus lens having a concave surface directed onto the object side; the second lens $L_2$ made of a biconvex plastic lens having an aspheric surface on its surface on the object side; the third lens $L_3$ made of a negative meniscus lens having a concave surface directed onto the imaging surface side; and the fourth lens $L_4$ made of a biconvex lens having a surface with a stronger curvature directed onto the imaging surface side. The rear group $G_2$ has the fifth lens $L_5$ made of a biconcave plastic lens having aspheric surfaces on both sides, whose surface with a stronger curvature is directed onto the object side on the optical axis X; the sixth lens $L_6$ made of a biconvex lens having a surface with a stronger curvature directed onto the object side; and the seventh lens $L_7$ made of a negative meniscus lens having a concave surface directed onto the object side.

Next, radius of curvature R (mm) of each lens surface, center thickness of each lens and air gap between neighboring lenses (collectively referred to as "axial spacing" hereinafter) D (mm), refractive power N and Abbe number $\upsilon$ of each lens at d line in the two-group zoom lens in accordance with Embodiment 1 are shown in Table 1.

Here, the numbers in this table (as well as in Tables 3 and 5) successively increase from the object side.

Also, each of the surfaces designated by "*" on the right side of R value in Table 1 (as well as in Tables 3 and 5) is formed as an aspheric surface and refers to an aspherical form computed by the following expression (A):

$$Z = CY^2/[1+(1-KC^2Y^2)^{1/2}] + A_1 Y^4 + A_2 Y^6 + A_3 Y^8 + A_4 Y^{10} \quad (A)$$

wherein Z is the length (mm) of a perpendicular drawn from a point on the aspheric surface having a height Y from the optical axis to a tangential plane (plane perpendicular to the optical axis) of the apex of the aspheric surface; C is the paraxial curvature of the aspheric surface; Y is the height (mm) from the optical axis; K is the eccentricity; and $A_1$ to $A_4$ are aspherical coefficients of the fourth, sixth, eighth, and tenth orders, respectively.

Also, the upper part of Table 2 shows values of the respective constants C, K, and $A_1$ to $A_4$ of each aspheric surface indicated by the above-mentioned expression (A).

Further, the middle part of Table 2 shows focal length f', back focus length l', F number, and field angle 2ω of the whole lens system as well as the distance between the two lens groups $G_1$ and $G_2$ at each of the positions of wide angle end (W), middle region (M), and telephoto end (T).

Also, focal length $f_1$ of the front group $G_1$, focal length $f_2$ of the rear group $G_2$, variable power ratio, paraxial focal length $f_{B1}$ of the first lens (fifth lens $L_5$) in the rear group $G_2$, and paraxial focal length $f_{B2}$ of the second lens (sixth lens $L_6$) in the rear group $G_2$ are set as shown in the lower part of Table 2.

Further, $f_w/f_{B1}=-0.6248$ and $f_w/f_{B2}=1.1103$ as shown in the lower part of Table 2, while $\upsilon_{B2}$ (Abbe number of the sixth lens $L_6$)=35.5 as shown in Table 1, thereby satisfying all of the above-mentioned expressions (1) to (3).

(Embodiment 2)

As shown in FIG. 2, the two-group zoom lens of Embodiment 2 is similar to that of Embodiment 1 in that it is constituted by the front group G1 comprising four sheets of lenses $L_1$ to $L_4$ and the rear group $G_2$ comprising three sheets of lenses $L_5$ to $L_7$. This zoom lens is different from that of Embodiment 1, however, in that the second lens $L_2$ is a biconvex lens having a surface with a stronger curvature directed onto the imaging surface side, that the fifth lens $L_5$ is a negative meniscus lens whose surface on the object side alone is an aspheric surface, and that the sixth lens $L_6$ is a biconvex lens having a surface with a stronger curvature directed onto the imaging surface side.

Next, radius of curvature R (mm) of each lens surface, axial spacing D (mm), refractive power N and Abbe number $\upsilon$ of each lens at d line in the two-group zoom lens in accordance with Embodiment 2 are shown in Table 3.

Also, the upper part of Table 4 shows values of the respective constants C, K, and $A_1$ to $A_4$ of each aspheric surface indicated by the above-mentioned expression (A).

Further, the middle part of Table 4 shows focal length f', back focus length l', F number, and field angle 2ω of the whole lens system as well as the distance between the two lens groups $G_1$ and $G_2$ at each of the positions of wide angle end (W), middle region (M), and telephoto end (T).

Also, focal length $f_1$ of the front group $G_1$, focal length $f_2$ of the rear group $G_2$, variable power ratio, paraxial focal length $f_{B1}$ of the first lens (fifth lens $L_5$) in the rear group $G_2$, and paraxial focal length $f_{B2}$ of the second lens (sixth lens $L_6$) in the rear group $G_2$ are set as shown in the lower part of Table 4.

Further, $f_w/f_{B1}=-0.4356$ and $f_w/f_{B2}=0.6567$ as shown in the lower part of Table 4, while $\upsilon_{B2}$ (Abbe number of the sixth lens $L_6$)=31.2 as shown in Table 3, thereby satisfying all of the above-mentioned expressions (1) to (3).

(Embodiment 3)

As shown in FIG. 3, the two-group zoom lens of Embodiment 3 is constituted by the front group $G_1$ comprising five sheets of lenses $L_1$ to $L_5$ and the rear group $G_2$ comprising three sheets of lenses $L_6$ to $L_8$. The front group $G_1$ has the first lens $L_1$ made of a biconcave lens having a surface with a stronger curvature directed onto the object side, the second lens $L_2$ made of a biconvex lens having a surface with a stronger curvature directed onto the object side, the third lens $L_3$ (cemented to the second lens $L_2$) made of a biconcave lens having a surface with a stronger curvature directed onto the object side, the fourth lens $L_4$ made of a biconvex lens having a surface with a stronger curvature directed onto the object side, and the fifth lens $L_5$ made of a biconvex lens having a surface with a stronger curvature directed onto the imaging surface side. The rear group $G_2$ has the sixth lens $L_6$ made of a negative plastic lens having aspheric surfaces on both sides, whose surface with a stronger curvature is directed onto the object side on the optical axis X; the seventh lens $L_7$ made of a biconvex lens having a surface with a stronger curvature directed onto the object side; and the eighth lens $L_8$ made of a biconcave lens having a surface with a stronger curvature directed onto the object side.

Next, radius of curvature R (mm) of each lens surface, axial spacing D (mm), refractive power N and Abbe number $\upsilon$ of each lens at d line in the two-group zoom lens in accordance with Embodiment 3 are shown in Table 5.

Also, the upper part of Table 6 shows values of the respective constants C, K, and $A_1$ to $A_4$ of each aspheric surface indicated by the above-mentioned expression (A).

Further, the middle part of Table 6 shows focal length f', back focus length l', F number, and field angle 2ω of the whole lens system as well as the distance between the two lens groups $G_1$ and $G_2$ at each of the positions of wide angle end (W), middle region (M), and telephoto end (T).

Also, focal length $f_1$ of the front group $G_1$, focal length $f_2$ of the rear group $G_2$, variable power ratio, paraxial focal length $f_{B1}$ of the first lens (sixth lens $L_6$) in the rear group $G_2$, and paraxial focal length $f_{B2}$ of the second lens (seventh lens $L_7$) in the rear group $G_2$ are set as shown in the lower part of Table 6.

Further, $f_w/f_{B1}=-0.7956$ and $f_w/f_{B2}=1.5293$ as shown in the lower part of Table 6, while $\omega_{B2}$ (Abbe number of the sixth lens $L_6$)=35.3 as shown in Table 5, thereby satisfying all of the above-mentioned expressions (1) to (3).

FIGS. 4 to 6, FIGS. 7 to 9, and FIGS. 10 to 12 are aberration charts showing various kinds of aberration (spherical aberration, field curvature, and distortion) of the two-group zoom lenses respectively in Embodiments 1 to 3 at their wide angle end, middle region, and telephoto end. As can be seen from these charts, in accordance with the zoom lenses of these embodiments, various kinds of aberration can be favorably corrected at any position from the wide angle end to the telephoto end.

Without being restricted to the foregoing embodiment, in the compact two-group zoom lens of the present invention, for example, the number and form of lenses constituting each lens group as well as the number of aspherical lenses and plastic lenses and the form of the aspheric surface can be selected appropriately.

For example, the number of the lenses constituting the front group may be three or five or more as long as the front group as a whole has a positive refractive power.

As explained in the foregoing, in the compact two-group zoom lens of the present invention, of the positive front group and the negative rear group constituting the zoom lens, the rear group is constituted by negative, positive, and negative lenses, whereby various kinds of aberration can be made favorable while the condition for precision in lens parts is alleviated. Accordingly, while a high magnification of about 3× is attained, improvement in productivity and reduction in manufacturing cost can be achieved.

TABLE 1

| Surface No. | R | D | N | $\upsilon$ |
| --- | --- | --- | --- | --- |
| 1 | −13.309 | 1.10 | 1.62041 | 60.4 |
| 2 | −21.895 | 0.50 | | |
| 3 | 44.218* | 2.00 | 1.49023 | 57.6 |
| 4 | −65.081 | 0.85 | | |
| 5 | 75.255 | 0.86 | 1.88300 | 40.8 |
| 6 | 16.068 | 0.19 | | |
| 7 | 14.904 | 5.00 | 1.48749 | 70.2 |
| 8 | −11.725 | 15.50 ~ 9.50 ~ 4.50 | | |
| 9 | 36.855* | 1.30 | 1.49023 | 57.6 |
| 10 | 189.549* | 0.30 | | |
| 11 | 34.684 | 3.20 | 1.59270 | 35.5 |
| 12 | −51.099 | 3.60 | | |
| 13 | −10.743 | 1.30 | 1.71300 | 53.9 |
| 14 | −101.739 | | | |

TABLE 2

| Aspheric surface | C | K | $A_1$ | $A_2$ | $A_3$ | $A_4$ |
|---|---|---|---|---|---|---|
| No. 3 | 0.022615 | 5.16025 | $-0.12216 \times 10^{-3}$ | $-0.89406 \times 10^{-6}$ | $0.94966 \times 10^{-9}$ | $-0.12275 \times 10^{-9}$ |
| No. 9 | -0.027133 | -17.87734 | $0.10805 \times 10^{-3}$ | $0.28167 \times 10^{-5}$ | $-0.73905 \times 10^{-7}$ | $0.28109 \times 10^{-9}$ |
| No. 10 | 0.005276 | -6579.924 | $0.17510 \times 10^{-3}$ | $-0.22087 \times 10^{-5}$ | $0.10913 \times 10^{-7}$ | $-0.28647 \times 10^{-9}$ |

|  | W | M | T |
|---|---|---|---|
| f' | 39.25 | 62.71 | 124.95 |
| l' | 9.51 | 28.89 | 80.30 |
| Fno | 3.5 | 5.6 | 11.3 |
| Field angle 2ω | 57.7° | 38.1° | 19.6° |
| Distance | 15.50 | 9.50 | 4.50 |

$f_1 = 27.60$          variable power ratio 3.19
$f_2 = -22.80$         $f_w/f_{B1} = -0.6248$
$f_{B1} = -62.82$      $f_w/f_{B2} = 1.1103$
$f_{B2} = 35.35$

TABLE 3

| Surface No. | R | D | N | ν |
|---|---|---|---|---|
| 1 | -22.703 | 2.09 | 1.6516 | 58.4 |
| 2 | -97.255 | 2.10 |  |  |
| 3 | 87.260* | 2.00 | 1.49023 | 57.6 |
| 4 | -80.287 | 0.55 |  |  |
| 5 | 36.938 | 2.28 | 1.83500 | 43.0 |
| 6 | 14.139 | 0.19 |  |  |
| 7 | 13.541 | 5.71 | 1.48749 | 70.4 |
| 8 | -12.032 | 16.00 ~ 10.00 ~ 5.00 |  |  |
| 9 | 368.140* | 1.30 | 1.49023 | 57.6 |
| 10 | 39.615 | 0.70 |  |  |
| 11 | 7735.94 | 3.00 | 1.68893 | 31.2 |
| 12 | -41.655 | 4.18 |  |  |
| 13 | -10.678 | 1.30 | 1.71300 | 53.9 |
| 14 | -42.258 |  |  |  |

TABLE 4

| Aspheric surface | C | K | $A_1$ | $A_2$ | $A_3$ | $A_4$ |
|---|---|---|---|---|---|---|
| No. 3 | 0.011460 | -21.8600 | $-0.11245 \times 10^{-3}$ | $-0.26858 \times 10^{-5}$ | $0.82360 \times 10^{-7}$ | $-0.13162 \times 10^{-8}$ |
| No. 9 | 0.002716 | 2050.0100 | $0.83565 \times 10^{-4}$ | $-0.92860 \times 10^{-6}$ | $0.26989 \times 10^{-7}$ | $-0.21888 \times 10^{-9}$ |

|  | W | M | T |
|---|---|---|---|
| f' | 39.50 | 63.69 | 130.03 |
| l' | 9.75 | 30.58 | 87.71 |
| Fno | 3.80 | 6.20 | 12.0 |
| field angle 2ω | 57.4° | 37.5° | 18.9° |
| Distance | 16.00 | 10.00 | 5.00 |

$f_1 = 26.92$          variable power ratio 3.29
$f_2 = -23.19$         $f_w/f_{B1} = -0.4356$
$f_{B1} = -90.67$      $f_w/f_{B2} = 0.6567$
$f_{B2} = 60.15$

TABLE 5

| Surface No. | R | D | N | υ |
|---|---|---|---|---|
| 1 | −19.335 | 1.68 | 1.62041 | 60.3 |
| 2 | 38.336 | 1.38 | | |
| 3 | 13.375 | 4.16 | 1.48749 | 70.3 |
| 4 | −14.742 | 1.18 | 1.80236 | 47.3 |
| 5 | 626.493 | 0.49 | | |
| 6 | 47.611 | 2.02 | 1.49023 | 57.6 |
| 7 | −73.366* | 0.10 | | |
| 8 | 45.184 | 3.60 | 1.48749 | 70.3 |
| 9 | −14.488 | 15.20 ~ 9.80 ~ 4.30 | | |
| 10 | 978.783* | 1.40 | 1.49023 | 57.6 |
| 11 | 22.706* | 0.20 | | |
| 12 | 18.825 | 4.268 | 1.59270 | 35.3 |
| 13 | −49.343 | 2.6485 | | |
| 14 | −11.781 | 1.30 | 1.80600 | 39.6 |
| 15 | 1570.958 | | | |

TABLE 6

| Aspheric surface | C | K | $A_1$ | $A_2$ | $A_3$ | $A_4$ |
|---|---|---|---|---|---|---|
| No. 7 | −0.01363 | 48.1840 | $0.17662 \times 10^{-3}$ | $0.22948 \times 10^{-6}$ | $0.17346 \times 10^{-7}$ | $-0.24432 \times 10^{-9}$ |
| No. 10 | −0.00102 | $-0.14189 \times 10^6$ | $0.11120 \times 10^{-3}$ | $0.13896 \times 10^{-5}$ | $-0.25173 \times 10^{-7}$ | $0.21179 \times 10^{-9}$ |
| No. 11 | 0.04404 | 4.83576 | $0.19922 \times 10^{-4}$ | $0.83870 \times 10^{-7}$ | $-0.11496 \times 10^{-7}$ | $0.58056 \times 10^{-10}$ |

| | W | M | T |
|---|---|---|---|
| f | 36.00 | 52.97 | 101.96 |
| l' | 10.61 | 26.24 | 71.32 |
| Fno | 3.8 | 5.6 | 10.8 |
| Field angle 2ω | 62.0° | 44.4° | 23.9° |
| Distance | 15.20 | 9.80 | 4.30 |

$f_1 = 25.67$  
$f_2 = -23.62$  
$f_{B1} = -45.25$  
$f_{B2} = 23.54$ variable power ratio 2.83  
$f_w/f_{B1} = -0.7956$  
$f_w/f_{B2} = 1.5293$

What is claimed is:

1. A two-group zoom lens comprising, successively from an object side, a front group ($G_1$) having a positive refractive power and a rear group ($G_2$) having a negative refractive power, in which distance between said front group and said rear group is changed so as to alter focal length of said zoom lens as a whole;

wherein said rear group ($G_2$) consists, successively from the object side, a first lens ($L_{B1}$) having a negative refractive power, a second lens ($L_{B2}$) having a positive refractive power, and a negative third lens ($L_{B3}$) having a concave surface directed onto the object side; and wherein the second lens $L_{b2}$ in the rear group has a radius of curvature of a surface faces the first lens ($L_{b1}$) of the rear group which differs from a radius of curvature of the image-side surface of the first lens ($L_{b1}$).

2. A two-group zoom lens according to claim 1, wherein, a paraxial focal length of said first lens ($L_{B1}$) is $f_{B1}$, paraxial focal length of said second lens ($L_{B2}$) is $f_{B2}$, focal length of said zoom lens as a whole at its wide angle end is $f_w$, and Abbe number of glass material of said second lens ($L_{B2}$) is $\omega_{B2}$, said zoom lens satisfies the following conditional expressions (1) to (3):

(1) $-1.0 < f_w/f_{B1} < -0.1$ (2) $0.5 < f_w/f_{B2} < 1.7$ (3) $\omega_{B2} < 43.0$ 3. A two-group zoom lens according to claim 1, wherein at least one aspherical lens is disposed in each of said front and rear lens groups ($G_1$) and ($G_2$); and wherein a lens closest to said object has only spherical lenses.

4. A two-group zoom lens according to claim 1, wherein at least one plastic lens is disposed in each of said front and rear lens groups ($G_1$) and ($G_2$); and wherein a first lens of said front lens group ($G_1$) is a glass lens.

5. A two-group zoom lens according to claim 1, wherein at least one plastic lens is disposed in each of said front and rear lens groups ($G_1$) and ($G_2$).

* * * * *

UNITED STATES PATENT AND TRADEMARK OFFICE
CERTIFICATE OF CORRECTION

PATENT NO. : 5,825,557

DATED : October 20, 1998

INVENTOR(S) : Ohno

It is certified that error appears in the above-identified patent and that said Letters Patent is hereby corrected as shown below:

column 9, claim 1, line 57, "$(L_{b2})$" should read --$(L_{B2})$--.
Lines 58 and 60 "$(L_{b1})$" should read --$(L_{B1})$--.

Signed and Sealed this

Second Day of March, 1999

Attest:

Q. TODD DICKINSON

*Attesting Officer*   Acting Commissioner of Patents and Trademarks